(12) United States Patent
Lu et al.

(10) Patent No.: US 8,296,033 B2
(45) Date of Patent: Oct. 23, 2012

(54) CURVE-RELATED ACCIDENT MITIGATION

(75) Inventors: Jianbo Lu, Livonia, MI (US); Daniel Domek Eisele, Ann Arbor, MI (US); Thomas Edward Pilutti, Ann Arbor, MI (US); Christopher Nave, Ypsilanti, MI (US); Levasseur Tellis, Southfield, MI (US); Jeffrey Daniel Rupp, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 435 days.

(21) Appl. No.: 12/557,999

(22) Filed: Sep. 11, 2009

(65) Prior Publication Data

US 2011/0066325 A1    Mar. 17, 2011

(51) Int. Cl.
*G06F 19/00* (2006.01)
*B60W 10/04* (2006.01)

(52) U.S. Cl. ... 701/93; 701/79; 340/426.31; 340/426.24

(58) Field of Classification Search .............. 701/200, 701/70, 93, 208, 79, 41; 340/438, 426.31, 340/426.24, 441; 180/168
See application file for complete search history.

(56) References Cited

U.S. PATENT DOCUMENTS

| | | | |
|---|---|---|---|
| 6,185,496 B1 * | 2/2001 | Matsuno | 701/70 |
| 6,208,917 B1 * | 3/2001 | McKissick et al. | 701/34 |
| 6,216,079 B1 | 4/2001 | Matsuda | |
| 6,343,253 B1 * | 1/2002 | Matsuura et al. | 701/200 |
| 6,415,215 B1 | 7/2002 | Nishizaki et al. | |
| 6,941,216 B2 * | 9/2005 | Isogai et al. | 701/96 |
| 7,062,382 B2 | 6/2006 | Courtenay et al. | |
| 7,321,825 B2 | 1/2008 | Ranalli | |
| 2005/0102083 A1 | 5/2005 | Xu et al. | |
| 2005/0209762 A1 | 9/2005 | Lu et al. | |
| 2005/0236895 A1 | 10/2005 | Matsumoto et al. | |
| 2005/0267663 A1 * | 12/2005 | Naono et al. | 701/48 |
| 2006/0195247 A1 | 8/2006 | Urvoy et al. | |
| 2006/0235607 A1 | 10/2006 | Nakashima | |
| 2007/0016372 A1 | 1/2007 | Browne et al. | |
| 2008/0183419 A1 | 7/2008 | Cong et al. | |
| 2008/0294321 A1 * | 11/2008 | Yamakado et al. | 701/93 |
| 2009/0048738 A1 * | 2/2009 | Iwazaki et al. | 701/44 |

* cited by examiner

*Primary Examiner* — Ronnie Mancho

(74) *Attorney, Agent, or Firm* — Frank A. MacKenzie; Brooks Kushman P.C.

(57) ABSTRACT

A vehicle control system includes one or more driver intent detection devices to detect at least a curve-negotiating intention of a driver. The system also includes one or more curvature detection devices, to detect or otherwise determine a road curvature. The system further includes one or more overspeed control devices, to, based at least in part on data received from the one or more curvature detection devices and data received from the one or more driver intent detection devices, cause braking to one or more vehicle tires and/or reducing engine torque to keep a vehicle accurately negotiating the curved road for the current driving condition.

18 Claims, 11 Drawing Sheets

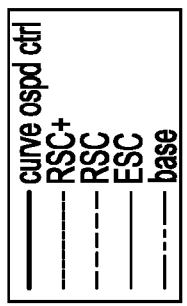
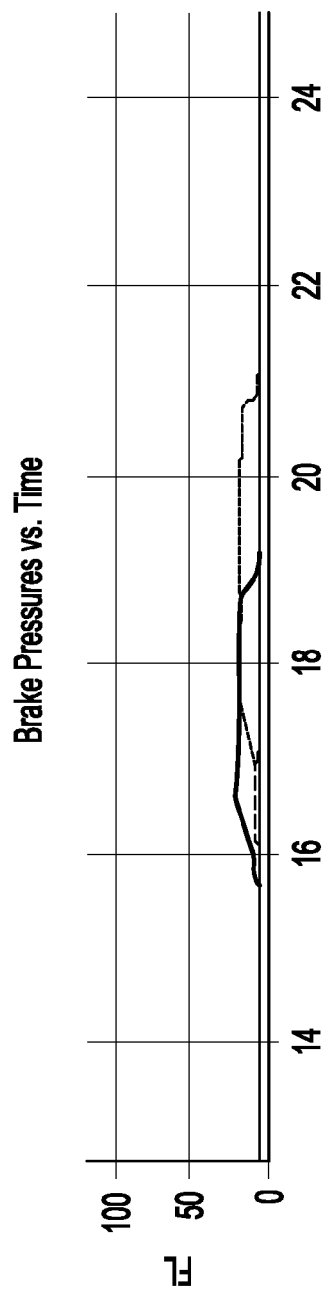
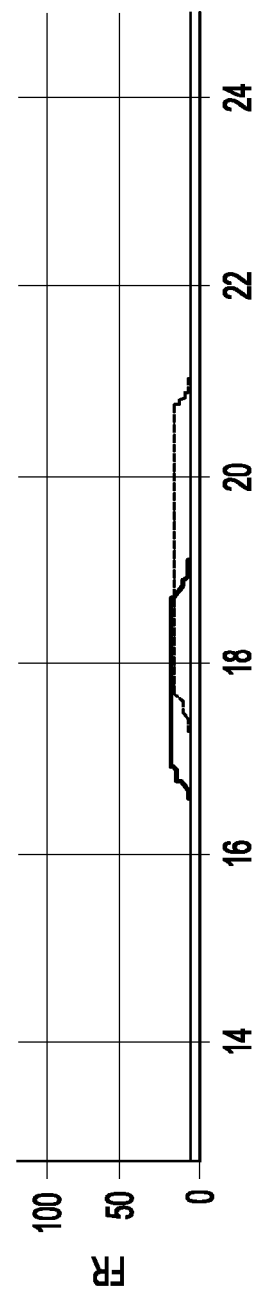
Fig-8A

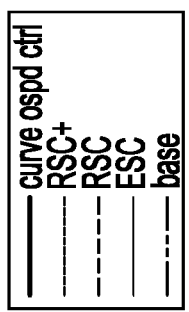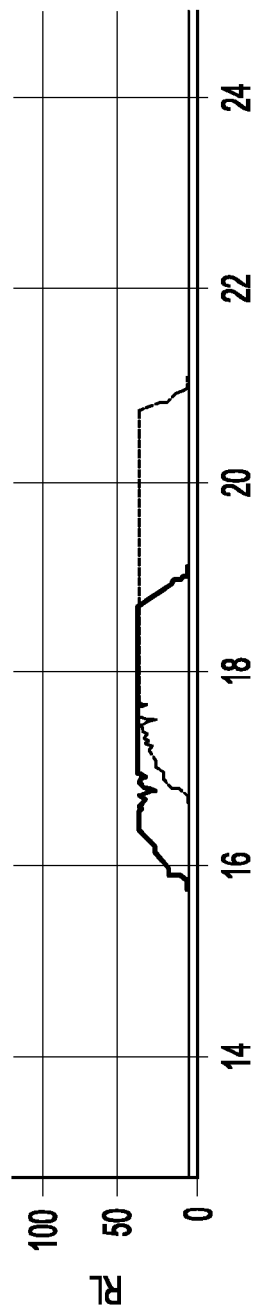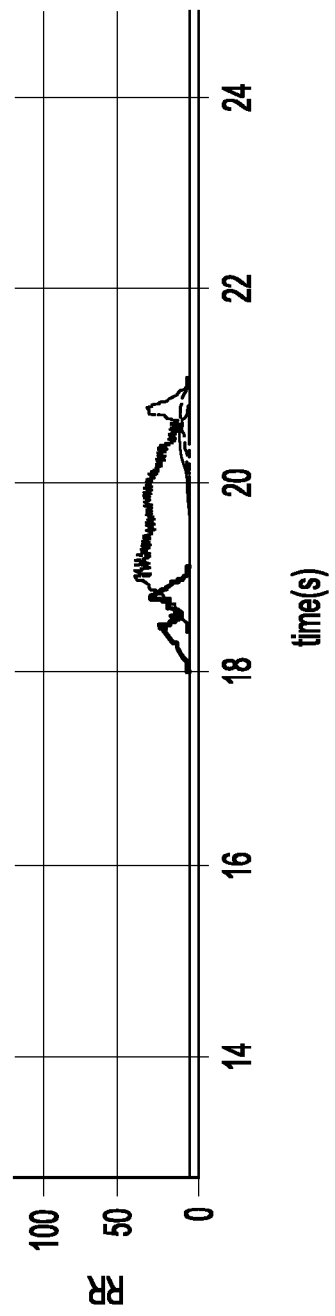
*Fig-8B*

CURVE-RELATED ACCIDENT MITIGATION

BACKGROUND

1. Technical Field

The illustrative embodiments generally relate to accident mitigation. More specifically, the illustrative embodiments generally relate to curve-related-accident mitigation.

2. Background Art

The instances of single vehicle roadway crashes comprise approximately 20 percent of all light vehicle crashes annually in the U.S. Within the single vehicle roadway departure crash category, crashes may generally result from four basic categories:

Lane drifting
Loss of control
Evasive maneuvers
Driver incapacitation

Countermeasures that attempt to address these crash categories may be derived from a variety of driver support systems.

Lane departure warning (LDW) and lane keeping assist (LKA) are conventionally addressed by computer vision through lane tracker detection that performs well when the vehicle is slowly drifting toward or across the lane marks. If the road geometry information is available through, for example, a digital map, the road edge might be calculated by computing a vehicle's deviation from the lane marks. Hence lane tracker based countermeasures can be used for mitigating certain road departure accidents. However there are two primary non-coverage issues that may occur in lane tracker based countermeasures. The first is due to not always being able to visually track the lane markers. The other issue occurs in the situation where the vehicle crosses the road edge with high lateral speed during high speed driving such that a warning or assist may be of little use to the driver.

Electronic stability control (ESC) can also be thought as a countermeasure for run-off-road accidents. ESC may help overcome the aforementioned non-coverage issues in lane mark based countermeasures: ESC uses the path determined from the driver's intent as the "virtual lane", which may eliminate the dependency on the lane tracker detection for run-off-road. ESC may use motion sensors to determine the high lateral velocity or sideslip situation where the vehicle deviates from the path determined from the driver's intended path and uses electronic chassis controls such as brake controls to correct the vehicle's path deviation. Such control actions can be conducted in several tens of milliseconds, hence, ESC can react very quickly and respond to high dynamic driving condition changes.

While ESC overcomes the lane tracker and reaction time issues, it generally assumes that the driver's intent is correct. If the driver is making a wrong decision, ESC will not be very effective in mitigating potential run-off-road accidents. However, lane tracker-based countermeasures (LDW and LKA) and the driver-intent-based countermeasure (ESC) might be complementary. Integrating both types of measures might generate countermeasures that can cover more crashes than each of the countermeasures can handle individually.

These types of countermeasures are integrated together in the illustrative embodiments to mitigate speeding related curve-driving crashes. The embodiments can be similarly expanded to other crash scenarios. Each year from 1983 to 2002, about 14,000 persons (about 30% of all motor vehicle traffic fatalities) were killed in speeding-related crashes.

Besides run-off-road accidents, there are other potential crash scenarios that could happen on over-speeding in a curve, including crashing into medians, guide rails, or the other stationary objects;
crashing with other moving vehicles;
on-road rollovers; and
multiple event accidents.

Those crash scenarios are potentially due to, for example:

a driver's panicked actions;
a high kinematical energy of the vehicle;
a demand of fast reaction time due to high speed; and
a driver's inability to adapt to sudden condition change through improvisation.

It is desirable to find electronic control functions to mitigate the curve-over-speed crashes. One example of a way to do this is to integrate driver-intent based stability control with lane tracker based vehicle control.

SUMMARY

In one illustrative embodiment, a vehicle control system includes one or more driver intent detection devices to detect at least a curve-negotiation intention of a driver. The system also includes one or more curvature detection devices, to detect or otherwise determine a road curvature, and one or more overspeed control devices. The overspeed control devices, based at least in part on data received from the one or more curvature detection devices and data received from the one or more driver intent detection devices, cause braking to one or more vehicle tires and/or reduce engine torque to keep a vehicle more accurately negotiating the curved road.

In a second illustrative embodiment, a vehicle control system includes one or more driver intent detection devices to detect at least a curve-negotiation intention of a driver. The system also includes one or more condition detection devices, to detect at least a road condition, and one or more curvature detection devices, to detect or otherwise determine a road curvature. The system further includes one or more overspeed control devices that, based at least in part on feedback received from the one or more condition detection devices, data received from the one or more curvature detection devices, and data received from the one or more driver intent detection devices, cause braking to one or more vehicle tires and/or reduce engine torque to keep a vehicle more accurately negotiating the curved road.

Also, in this illustrative embodiment, a determination by the one or more overspeed control devices that braking and/or reducing engine torque needs to be applied is based at least on a detected yaw rate error between the measured vehicle yaw rate and the yaw rate allowed by the curved road.

BRIEF DESCRIPTION OF THE DRAWINGS

FIGS. 8*a* and 8*b* show exemplary applied brake pressures; and

DETAILED DESCRIPTION

Accident on curved-road driving is often the result of excessive vehicle speed for the road or road conditions when a driver's steering is either less than required value or the vehicle does not respond to the driver's steering request. Also, the driver may provide too large and sudden of a steering correction, which may need subsequent steering correction to reduce the vehicle's trajectory overshoot. Further, the combination of driver braking and steering could significantly saturate the front tire forces to increase the vehicle's understeer tendency.

Regardless of the driver's actions during driving on curved road sections, road departure crashes may be mitigated by electronic controls that aid the driver in entering a curve at a passable speed or controlling the speed once in a curve to reduce the vehicle's turning radius to match the road curvature.

In at least one illustrative embodiment, the required forward sight distance may be prohibitive for reliable computer-vision-based detection of upcoming curves. One potentially reliable source of upcoming preview information is a digital map database that can "look" ahead into the road network ahead of the vehicle, detect upcoming road curvature, and then take action appropriate to aid the driver in negotiating the curve.

With current technology advancement in ADAS system using GPS navigation systems and vision sensors, information relating to an upcoming curve can be used to warn a driver, such as in an exemplary Curve-Over-Speed Warning (COSW). COSW may provide the warning well in advance of the curve in order for the driver to have adequate time to adjust the driving speed of the vehicle prior to the curve.

One improvement of COSW alone is to slow down the vehicle by automatically braking the vehicle before the vehicle entering the curve. Such an approach may require one or more trade-offs between the driver's control and the automatic control, such as, but not limited to:

if the automatic braking is too early, the vehicle may lose too much speed and the braking will be apparent and may be unsettling to the driver;

if the automatic braking is too late, the vehicle may not be able to negotiate the curve properly and a run-off-road crash is more likely to happen;

in certain cases, such as road branches with split roadway of different curvatures (as see in FIG. 1), the system may not be able to determine which curve the vehicle is going to enter before the vehicle enters one of the curves. The uncertainty may develop into two failure modes: where the driver intends to go straight, and the vehicle is automatically decelerated for the curve not taken, or where the driver's actions are interpreted by the navigation system such that it determines the vehicle will be going straight, but rather the vehicle is turning into the lower curve and is not decelerated.

Figure 1:
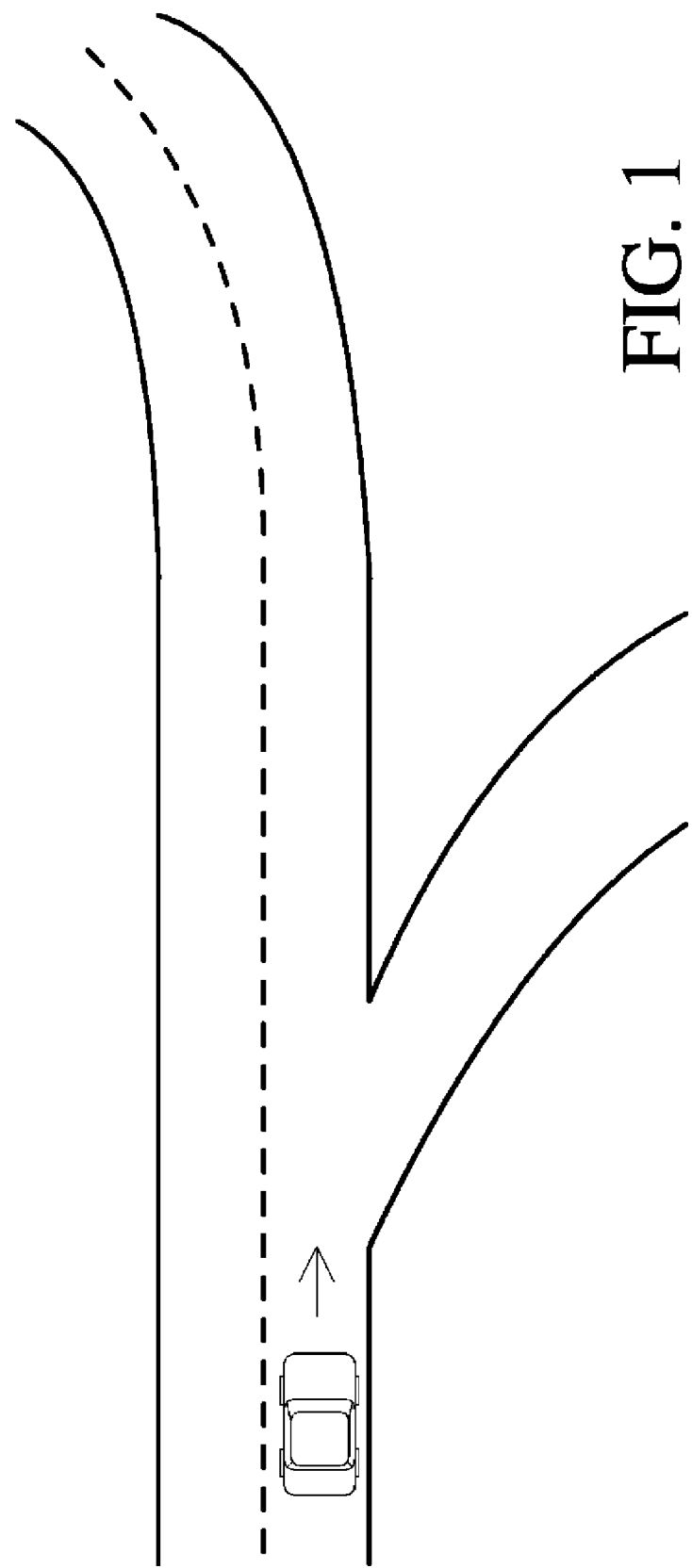
FIG. 1 shows an exemplary case of a branched exit ramp case.

In the branched exit ramp case, shown in exemplary fashion in FIG. 1, it may be difficult to reliably determine beforehand which road the driver is going to take. Only if the vehicle is distinctly already driving on the curved exit ramp, can the ADAS system be sure that the vehicle is negotiating the curve. In this case, slowing down vehicle then is the responsibility of the driver. If the driver misjudges a road condition or is otherwise too late in slowing down the vehicle to the proper speed, an accident condition can develop.

Figure 2:
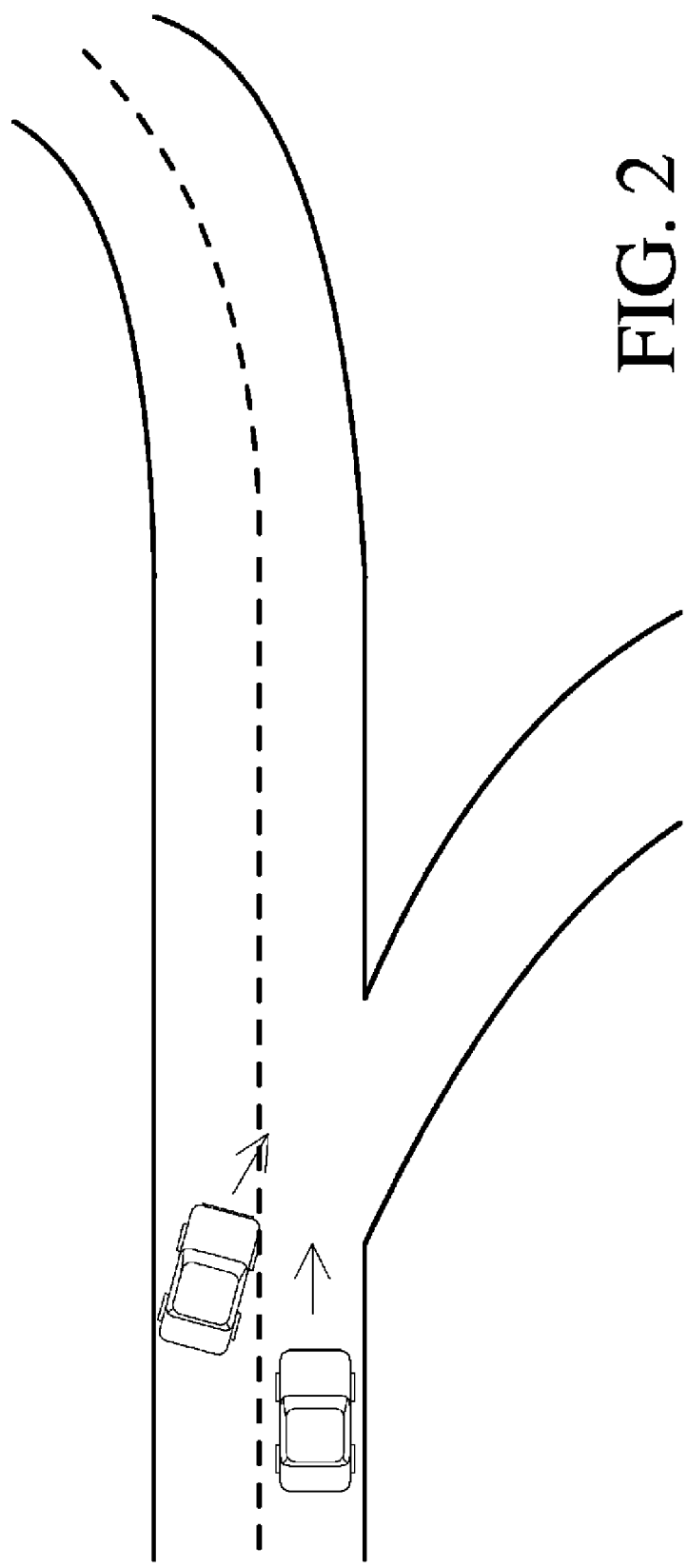
FIG. 2 shows an illustrative example of over-taking another vehicle to enter an exit-ramp.

Another illustrative example is a case of over-taking another vehicle to enter an exit-ramp as shown in exemplary fashion in FIG. 2. The over-taking vehicle might not have time to slow down to the proper speed to exit the ramp. Such a case could also happen when unplanned curve negotiating demands a shorter than normal driving response time. For example, during night-time driving, the driver's view may be limited and many times the driver will need a faster-than-daytime driving reaction time to steer and brake a vehicle in order to negotiate a curve.

Other exemplary cases include, but are not limited to, traveling on a curved road with a wet surface or covered with snow/ice, where a safe vehicle speed is significantly slower than a normally safe speed.

In general, if a driver doesn't slow down the vehicle speed enough or the driver's reaction to a change in road conditions/direction is too late, an exemplary accident avoidance system may rely on one or more illustrative embodiments to aid in accident prevention.

One potential strategy to mitigate a high-speed-curve accident is though use of stability controls. The stability control system may help the vehicle behave in a way which is transparent to the driver regardless of road conditions and driving conditions, so as to reduce the degree of the driver panic and unnecessary corrections from the driver.

While the stability control systems generally keep the vehicle on-road, they may require a driver to make correct driving decisions, since they are often dependant on the driver's intent to make control decision, e.g., without limitation, to judge the understeer or oversteer driving condition of the vehicle. In certain case, the driver's misjudgment of or the wrong intent for the current driving condition could potentially undermine the safety benefit of the existing stability control systems such as electronic stability controls (ESC). Alternatively, the stability control function may never activate at all. It is desired to include driver-intent independent stability controls to mitigate crashes when the driver misjudges the current driving condition.

The illustrative embodiments augment the driver-intent based understeer control is integrated with road curvature based control to determine the brake control command so as to achieve curve-overspeed accident mitigation (COSAM) functionality.

Figure 3:
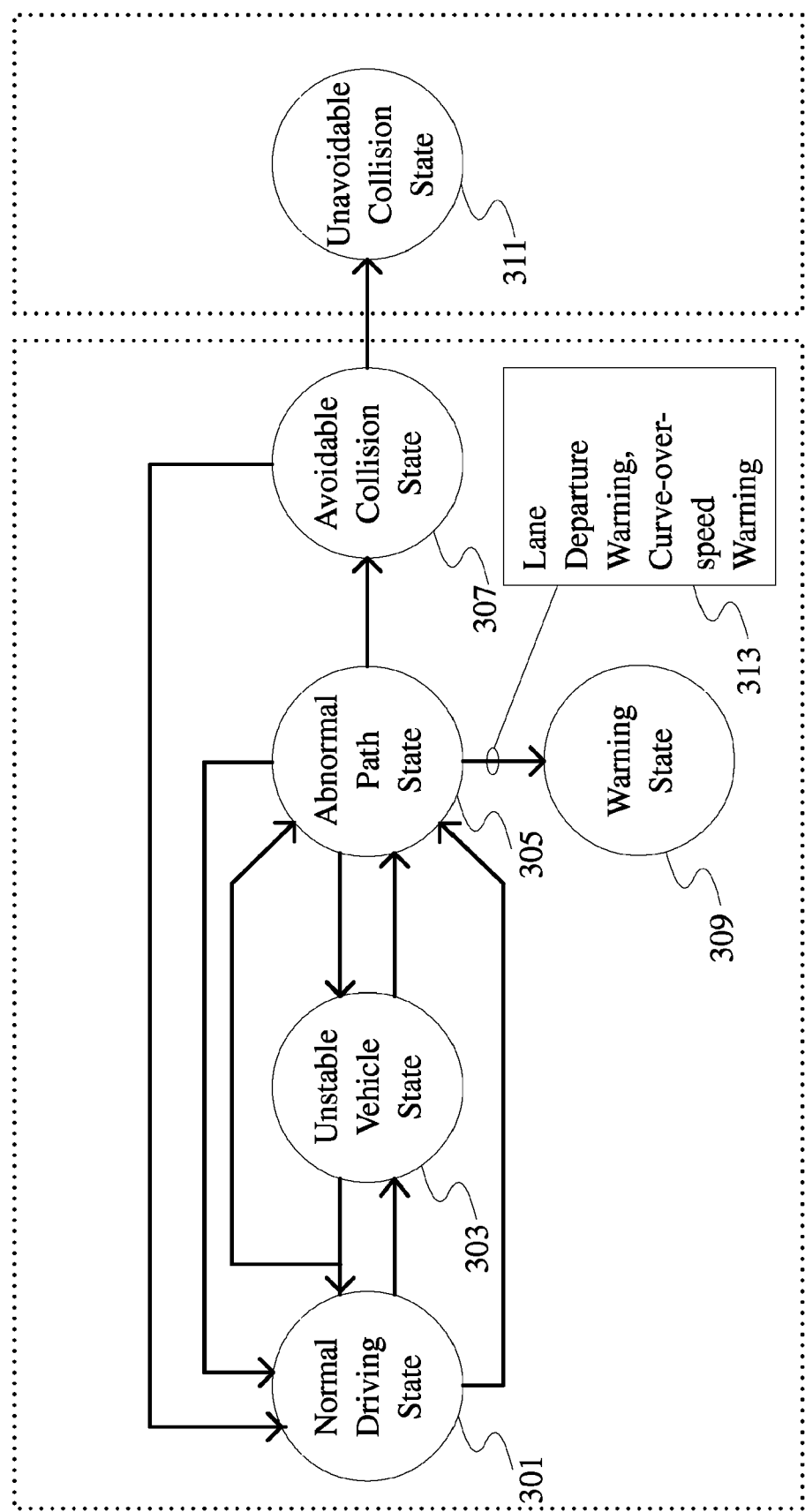
FIG. 3 shows an exemplary state transfer diagram providing one illustrative example of vehicle dynamics control and active safety.

A state transfer diagram providing one illustrative example of vehicle dynamics control and active safety is shown in FIG. 3.

The whole safety system states can be divided in to 6 states such as:

Normal driving state 301
  A state that is achieved by ordinary drivers on a normal road surface
Unstable vehicle state 303
  A state where the involved vehicle experiences a spin-out, a roll-instability or a lateral instability such as sliding sideways.
Abnormal path state 305
  A state where the vehicle is driven on a path which is not safe.
Avoidable collision state 307
  At this state, an imminent crash or collision with a stationary object or a moving object can be avoided through either electronic controls or by the driver Unavoidable collision state 311
At this state, an imminent crash or collision cannot be totally avoided through either electronic controls or by the driver Warning state 309
At this state, a driver is warned of a potential driving hazard and if a driver takes timely measures based on the warning signals, the driver can safely maneuver the vehicle to avoid potential accident One aspect of an illustrative embodiment may alter other safety system states, using the driver's driving and the aid of electronic controls, so as to maintain a normal driving state.

The abnormal path state is heavily associated with many accidents that are complimentary to the accidents associated with the unstable vehicle state. With the addition of environmental sensor information, such an abnormal path state might now be altered to the normal driving state. In the illustrative embodiments, the general idea of utilizing environmental sensor information to expand the stability control operation range is tailored to curve-over-speed accident mitigation.

Existing understeer controls try to turn a vehicle more if the vehicle's yaw response lags or falls short of the response estimated from the driver's steering input due, for example, to front tire force saturation. It is a driver-intent-centered control strategy: a sustained driver steering wheel angle is interpreted as a need for help in turning the vehicle; it may also be interpreted as an instance where the vehicle is not able to increase the cornering power enough for the vehicle to turn. Therefore, the controller may reduce engine power to slow down the vehicle, and if the engine torque reduction is not enough, braking on potentially all four wheels is conducted. Denoting the yaw rate error $\omega_{zerr}$ and the engine torque reduction torque as $\tau_{engine}$, then they can be computed as follows:

$$\omega_{zerr} = \omega_z - \omega_{ztgt} - \omega_{db}$$

$$\tau_{engine} = \kappa_{pet}\omega_{zerr} + \kappa_{iet}\int\omega_{zerr}dt + \kappa_{det}\omega_{zerr}$$

Where:
$\omega_{ztgt}$ the desired or target yaw rate determined through a two wheel vehicle model called a bicycle model to capture the driver's steering intent;
$\omega_{db}$ is the yaw rate deadband which might vary with respect to the driving conditions;
$\kappa_{pet}$, $\kappa_{iet}$, and $\kappa_{det}$ are feedback control gains which might vary with respect to driving conditions.

If the above computed engine torque command $\tau_{engine} \leq 0$, the engine torque reduction becomes "engine braking" and the braking may be kicked in to help slow down the vehicle in order to regulate the yaw rate error $\omega_{zerr}$. Since the front tires are already saturated, the braking portion of the understeer control may first brake the rear wheels in proportion to the normal loading of the vehicle. This generates a deceleration force to reduce the speed of the vehicle so that the cornering force required to make the vehicle negotiate the turn desired by the driver can be met by the tires. If such rear braking cannot reduce the yaw rate error $\omega_{zerr}$, then, the brake pressure of all the four wheels may be simultaneously increased (but proportional to the normal loading of each wheels) to further slow down the vehicle so as to indirectly reduce the turning radius of the vehicle.

The illustrative embodiments may include an integrated understeer control which may react, directly or indirectly, to curvature information obtained from an on-board GPS navigation system. For example, the target yaw rate $\omega_{ztgt}$ can be replaced by a desired yaw rate required by the curvature info:

$$\omega_{ztgt-curvature} = f(c, v_x, \delta, \omega_z, a_y)$$

Where:
$f(\ )$ denotes a nonlinear function map; and
$c, v_x, \delta, \omega_z, a_y$ are the curvature, vehicle current speed, steering wheel angle, vehicle current yaw rate, and vehicle current cornering acceleration, respectively.

Figure 4:
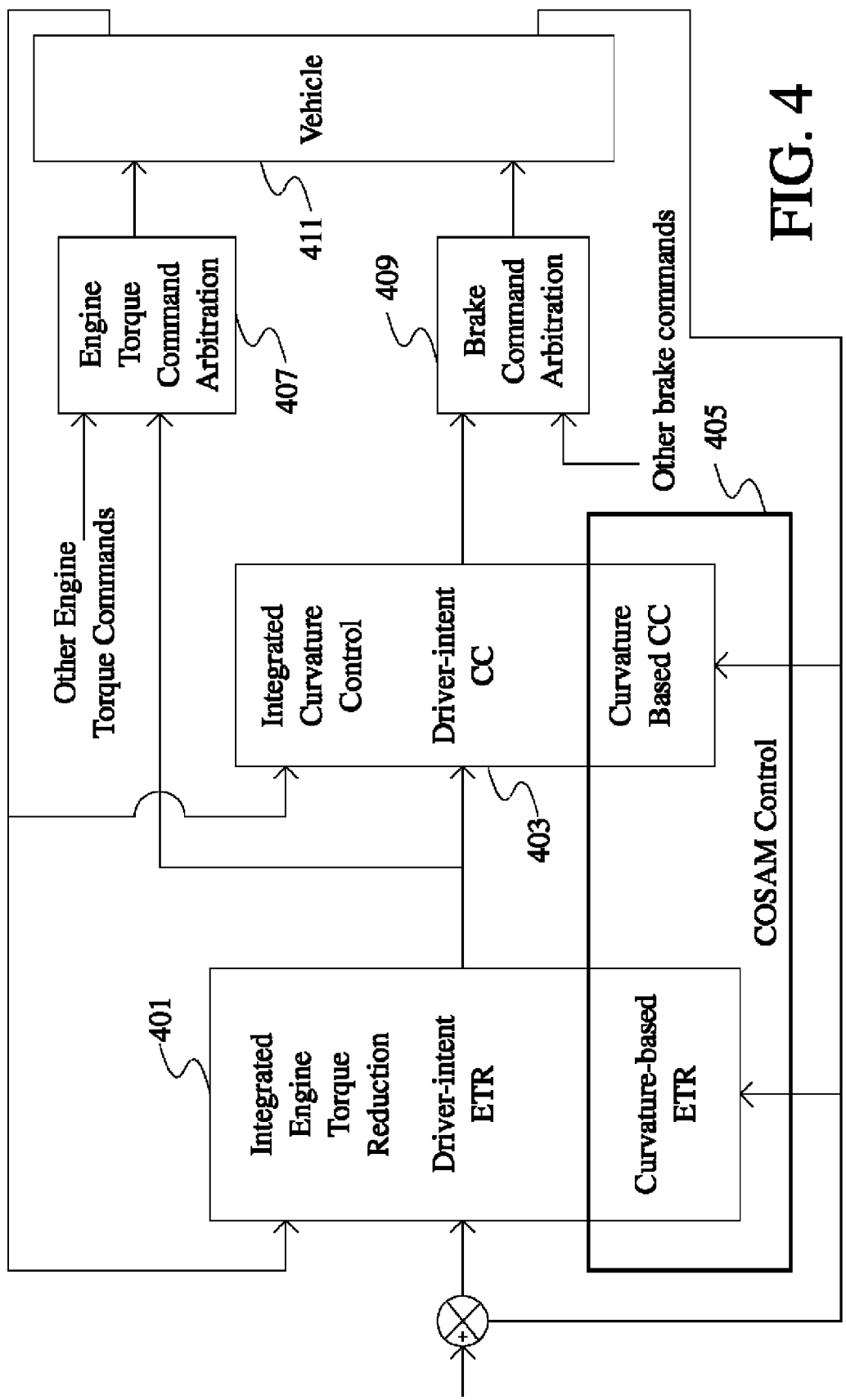
FIG. 4 shows one illustrative example of a control module.

FIG. 4 shows one illustrative example of a control module.

In this illustrative example, integrated engine torque reduction 401 includes driver-intent engine torque reduction and curvature-based engine torque reduction. This portion of the system receives feedback from the vehicle 411, coupled with curvature information from, for example, a GPS navigation system in the vehicle. Integrated curvature control 403 includes an enhanced driver-intent understeer control called a driver-intent based curvature control (DICC) (which aims to assist the driver in negotiating a curve reflected from the driver's steering intention without directly using the actual curvature information and curvature based curvature control (CBCC) and also receives feedback from the vehicle and curvature information from, for example, the GPS navigation system. Together, the curvature-based engine torque reduction and curvature-based curvature control combine to make up COSAM control. The integrated curvature control provides input to a brake command arbitration module 409 and the integrated engine torque reduction provides input to an engine torque command arbitration module.

Figure 5:
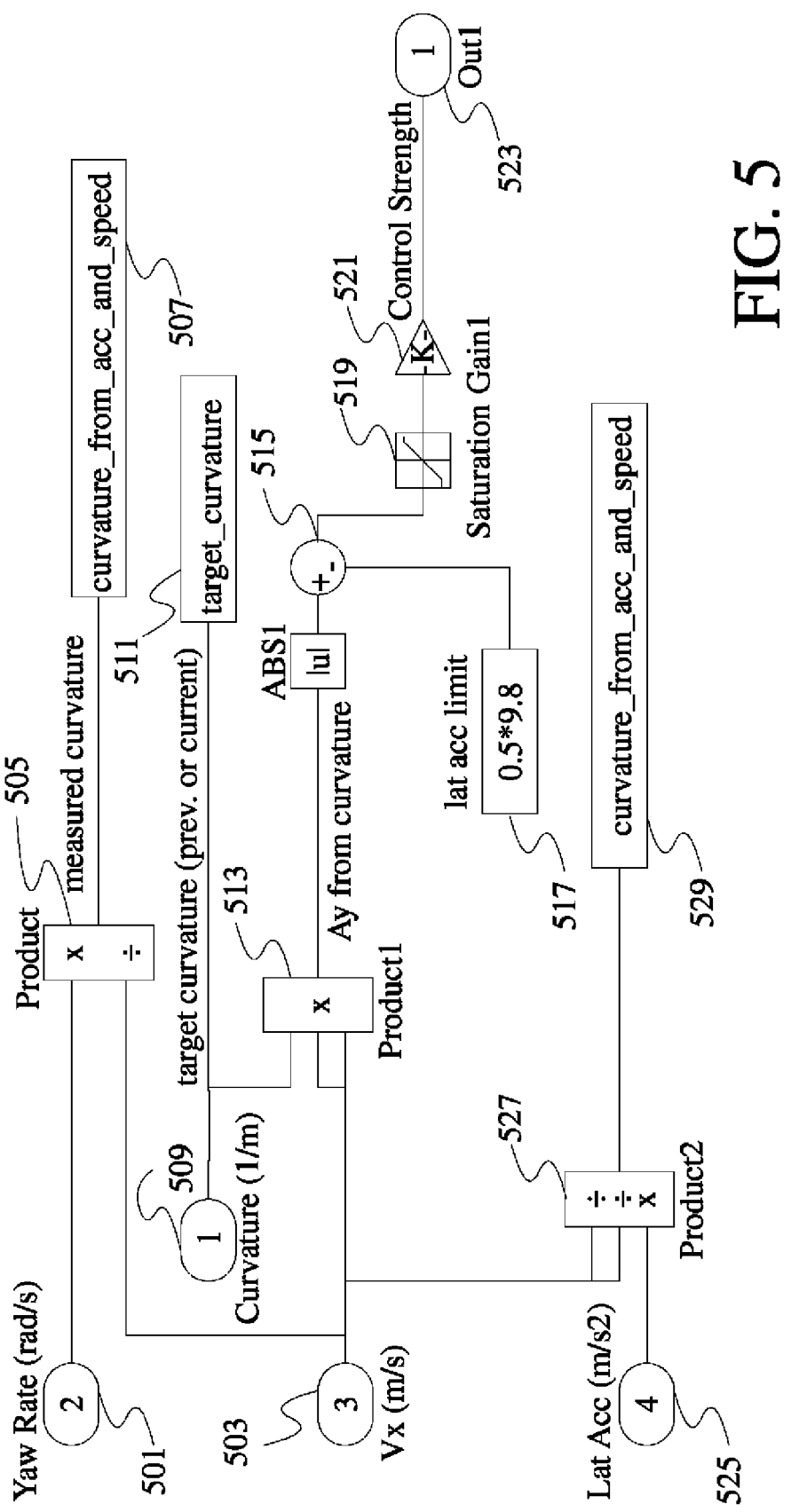
FIG. 5 shows an illustrative COSAM control strategy.

One illustrative COSAM control strategy can be seen in FIG. 5, where the road curvature is fed in through port 509, the yaw rate sensor measurement is fed in through port 501, the vehicle longitudinal velocity is fed in through port 503, and the vehicle longitudinal acceleration is fed in through port 525.

The target road curvature or the current road curvature, the vehicle velocity, and the other variables are manipulated in 513 (while the other functional manipulation is possible, the current 513 is illustrated with multiplication for simplicity) to generate a maximum allowed cornering acceleration sending to 515. This may be further manipulated through 515, 519 and 521 to generate a feedback control signal sending out to 523. The target curvature is also stored in 511 for easy access by the other control modules.

In order to achieve robust prediction, the target curvature is compared with a curvature computed through 505 (multiplication and division are only for simplicity, other operation is possible) and sent to 507 and another curvature computed in 527 (divisions and multiplications are used here for illustration, other operations are possible) sent to 529. Some nonlinear filtering algorithms may be used to smooth the final curvature value based on the above three curvature values.

The road curvature based curvature control may be arbitrated with the driver-intent based curvature control based on the various vehicle dynamics states as shown in FIG. 3. Control can also be arbitrated with the other active safety features based on the state transition in FIG. 3 and provide a warning to the driver. For instance, a vehicle enters a wet curved road (abnormal path state) from a normal driving condition. The abnormal driving condition will prompt the driver to steer more. The traditional ESC control would need the driver to steer more in order to use differential braking to help negotiate the curve. The road curvature based curvature control can determine the mismatch between the road curvature and vehicle travel trajectory even when the driver's steering input is below the activation threshold of ESC.

To evaluate the performance of this Curvature Control, a veDYNA XC90 vehicle model was utilized. A veDYNA driver model with preview was used to follow a predefined path: a straight section followed by a constant radius bend of curvature 0.015 1/m followed by another straight section. The road surface friction level mu was set to approximately 0.6 g to ensure that the front tires could be easily saturated but that braking authority was still high. At this mu level an entry speed of 79 kph with drop throttle was enough to saturate the front tires and limit the curvature the vehicle was able to follow.

Figure 6:
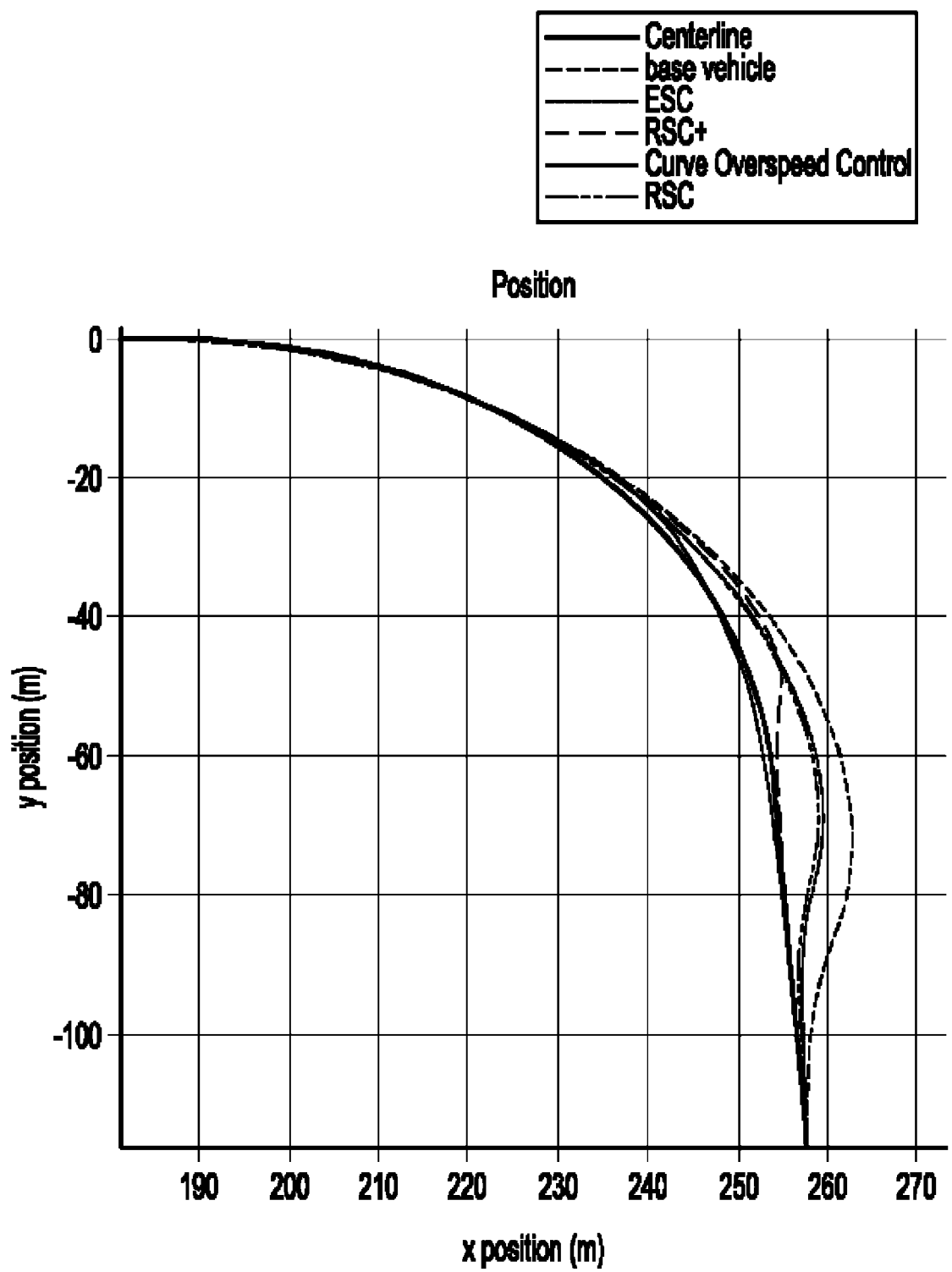
FIG. 6 shows exemplary vehicle paths.

FIG. 6 shows the vehicle paths for various control cases: base vehicle with control off, with traditional electronic stability control (ESC) on, with roll stability control (RSC) on, with a roll stability control with improved slow sideslip buildup detection (called RSC+), and with Curve Overspeed Control. Although at least one Curve Overspeed Control case does include sideslip control, it does not activate in this maneuver and therefore can also represent an example of a standalone Curve Overspeed/Curvature control. At this speed, the Curve Overspeed Control case shows the best path-following. The driver was able to follow the curve with much less path error than the other controllers. The next best performance comes from RSC+ due to its improved low sideslip buildup detection and the improved sideslip control. Curvature Control is able to improve path following midway through the curve once enough yaw rate understeer is observed to cause activation. RSC and ESC only cases are very similar, as expected since RSC should not be requesting much pressure on a 0.5-0.6 g road surface. Last, as expected, the base vehicle with no braking control deviates the most from the intended path.

Figure 7A:
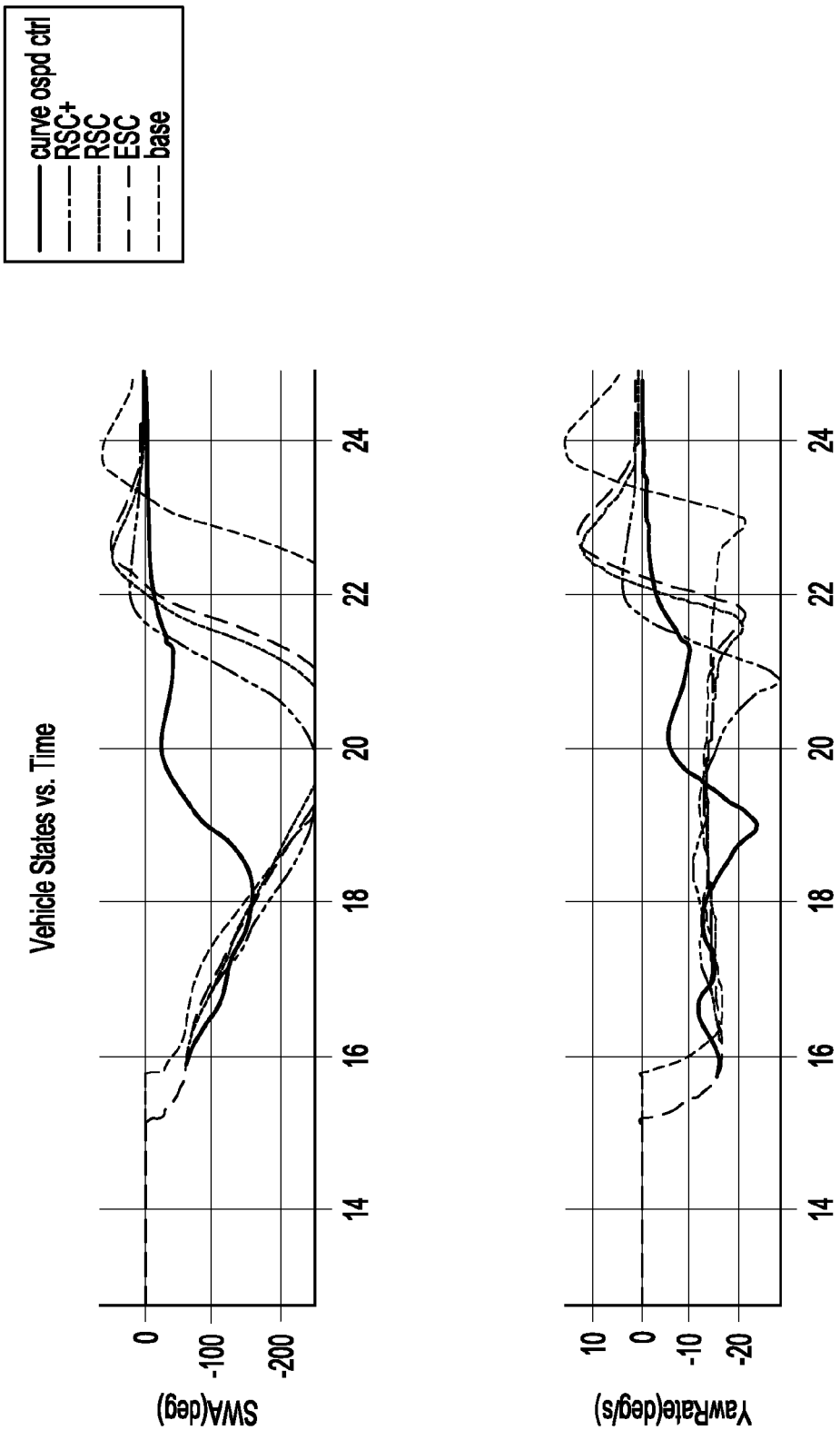
FIGS. 7a and 7b show exemplary vehicle response.
Figure 7B:
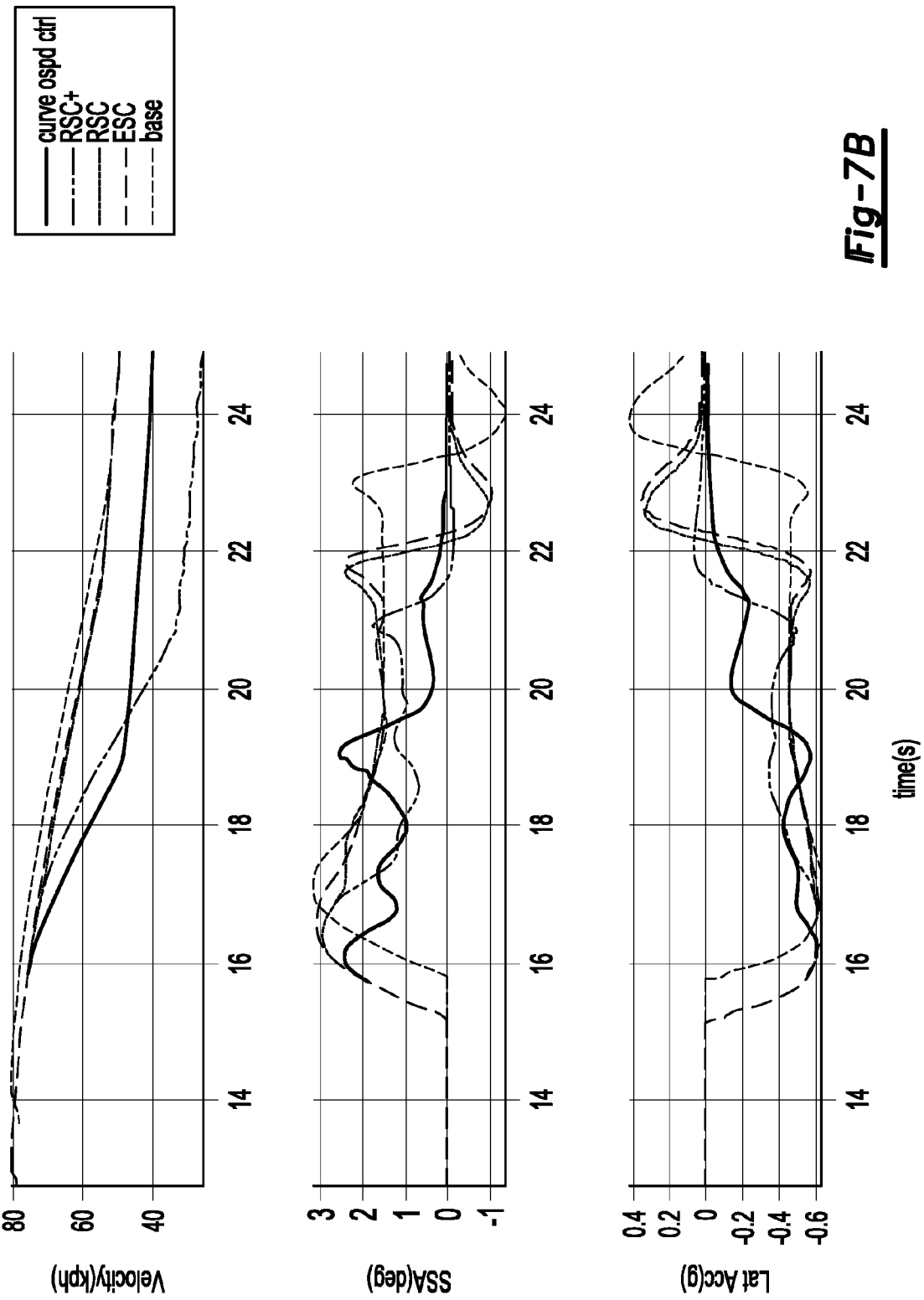

FIGS. 7a and 7b show vehicle response. For all cases except Curve Overspeed Control, the driver saturates the steering at the 250 degree limit imposed for this maneuver. This is because the Curve Overspeed Control reduces vehicle speed sooner than all the other controllers as shown in the longitudinal velocity plot. This translates directly to less required steering. FIGS. 8a and 8b shows the applied brake pressures for each case. The brake profiles for Curve Overspeed Control look similar to RSC+ but occur sooner as expected. For the RSC only case, there is a small RSC intervention on the outer front tire which explains the slightly different path compared to ESC only.

Figure 9:
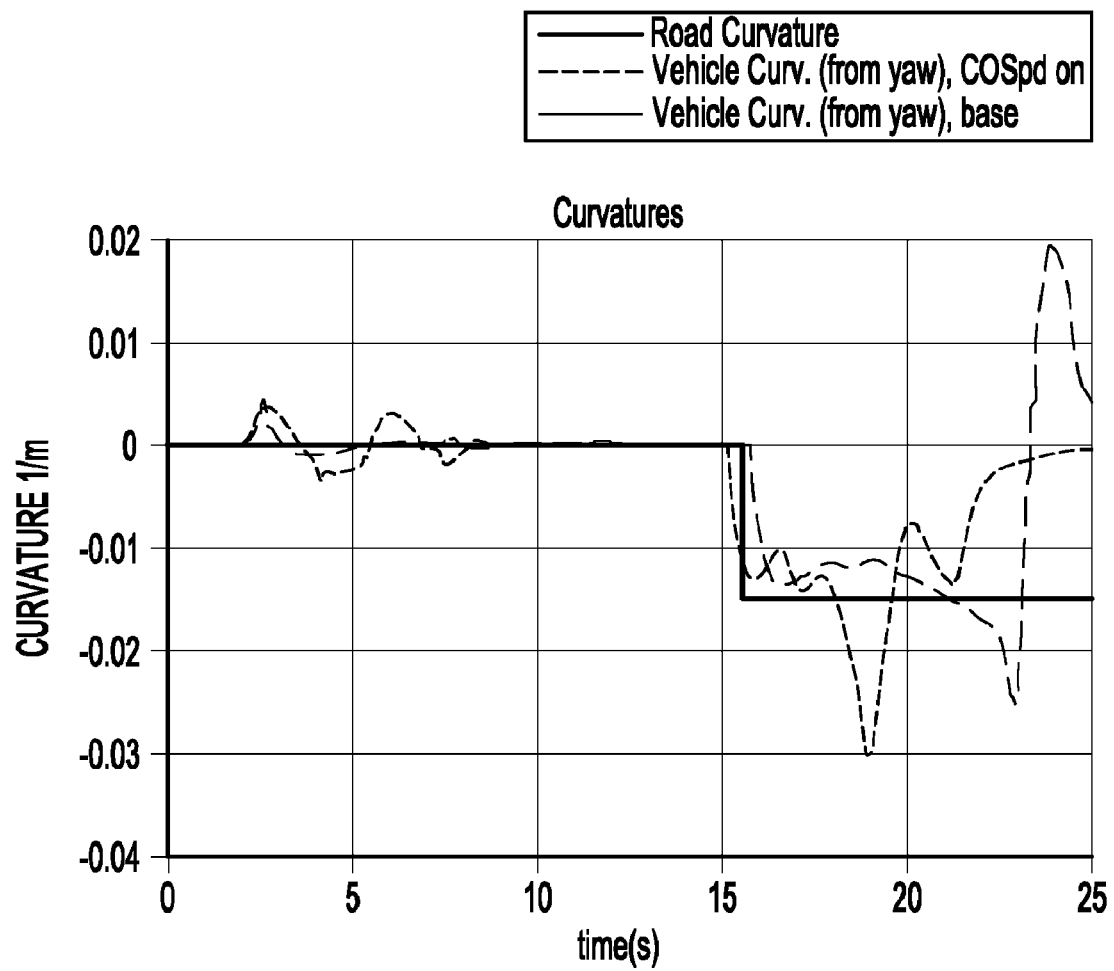
FIG. 9 compares a road curvature to a vehicle's path curvature.

FIG. 9 compares the road curvature to the vehicle's path curvature for the Curve Overspeed Control case and the base vehicle case. The vehicle path curvature for the control on case is close to the road curvature as expected from the path plots, but it overshoots at time=18 seconds. This is because the vehicle still slid slightly wide and the driver needed to turn harder to get back to the desired path.

As can be seen from FIGS. 6-9 and the accompanying discussion, curve overspeed control incorporating elements such as driver intent, vehicle feedback, and or curvature information (from, e.g., without limitation, a GPS) provide an enhanced control system over traditional curvature control based on, for example, a pure driver intent model without directly using the preview or current road curvature information.

What is claimed:

1. A system comprising:
a driver intent detection device to detect at least a driver's curve-negotiation intention;
a curvature detection device, to detect/determine a road curvature;
one or more overspeed control devices, to, based at least in part on data received from the curvature detection device and data received from the driver intent detection device, cause braking and/or reduce engine torque based on a yaw rate error and to reduce the yaw rate error.

2. The system of claim 1, wherein the data from the driver intent detection device includes a speed of travel.

3. The system of claim 1, wherein the data from the driver intent detection device includes a degree-of-turning with respect to a steering command.

4. The system of claim 1, wherein the curvature detection device includes at least one GPS detection device.

5. The system of claim 4, wherein the data received from the curvature detection device includes at least a true or estimated road curvature received from the at least one GPS detection device, and wherein the data further includes a vehicle position.

6. The system of claim 5, wherein the one or more overspeed control devices is operable to determine, based at least in part on the received road curvature and vehicle position, whether or not a projected path of the vehicle is an abnormal path.

7. The system of claim 5, wherein braking first occurs on rear wheels in proportion to a normal loading of the vehicle and then, if this braking is insufficient to satisfactorily reduce yaw rate error, brake pressure of all four wheels is increased in proportion to the normal loading of each wheel.

8. A vehicle control system comprising:
one or more driver intent detection devices to detect at least a curve-negotiation intention of a driver;
one or more condition detection devices, to detect at least a road condition;
one or more curvature detection devices, to detect or otherwise determine a road curvature;
one or more overspeed control devices, to, based at least in part on feedback received from the one or more condition detection devices, data received from the one or more curvature detection devices, and data received from the one or more driver intent detection devices, cause braking to one or more vehicle tires and/or reducing engine torque based on a yaw rate error and to reduce the yaw rate error.

9. The system of claim 8, wherein the data from the one or more driver intent detection devices includes a speed of travel.

10. The system of claim 8, wherein the one or more condition detection devices includes a stability control device.

11. The system of claim 8, wherein the feedback from the one or more condition detection devices includes at least one of spin-out, roll-instability or lateral instability.

12. The system of claim 8, wherein the data from the one or more driver intent detection devices includes a degree-of-turning with respect to a steering command.

13. The system of claim 8, wherein the overspeed control device is further operable to cause braking and/or reducing engine torque based on a vehicle current yaw rate.

14. The system of claim 8, wherein the overspeed control device is further operable to cause braking and/or reducing engine torque based on a vehicle cornering acceleration.

15. A vehicle control system comprising:
one or more driver intent detection devices to detect at least a curve-negotiating intention of a driver;
one or more condition detection devices, to detect at least a road condition;
one or more curvature detection devices, to detect or otherwise determine a road curvature;
one or more overspeed control devices, to, based at least in part on feedback received from the one or more condition detection devices, data received from the one or more curvature detection devices, and data received from the one or more driver intent detection devices, cause braking to one or more vehicle tires and/or reducing engine torque to keep a vehicle accurately negotiating the curved road for the current driving condition, wherein a determination by the one or more overspeed control devices that braking and/or engine torque reduction needs to be applied is based at least on detected yaw rate error for the current driving condition and the braking and/or engine torque reduction is performed to reduce yaw rate error.

16. The system of claim 15, wherein the yaw rate error is equal to a current yaw rate minus a target yaw rate minus a yaw rate deadband.

17. The system of claim 16, wherein the yaw rate deadband varies with respect to driving conditions.

18. The system of claim 16, wherein the target yaw rate is determined at least in part based on road curvature, vehicle speed, steering wheel angle, current yaw rate and cornering acceleration.

* * * * *